United States Patent Office 3,541,134
Patented Nov. 17, 1970

3,541,134
REACTION PRODUCTS OF ROSIN-FUMARIC ACID ADDUCTS AND ALKYLENE OXIDES
Jay B. Class, Wilmington, Del., assignor to Hercules Incorporated, Wilmington, Del., a corporation of Delaware
No Drawing. Filed July 20, 1966, Ser. No. 566,460
Int. Cl. C07c 69/74
U.S. Cl. 260—468.5                                          5 Claims

ABSTRACT OF THE DISCLOSURE

Disclosed is a compound having the formula

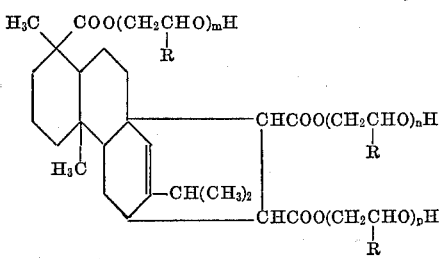

wherein R is selected from the group consisting of hydrogen, methyl, ethyl, phenyl and halogenated methyl; and wherein $m$, $n$, and $p$ are whole numbers 1, 2 or 3, the total of $m$, $n$, and $p$ being at least 3 and no greater than 6. Compounds of this type have utility as ingredients of synthetic foams and as components of protective coating compositions.

---

This invention relates to the chemical art. Particularly, this invention relates to novel condensation products derived by condensing an epoxy compound with levopimaric acid-fumaric acid adduct.

In accordance with this invention, there are provided novel condensation products of epoxy compounds and levopimaric acid-fumaric acid adducts. The products are water-insoluble resin alcohols.

It is known that fumaric acid will add to the levopimaric acid component of rosin by the Diels-Alder reaction to provide an adduct having the structure

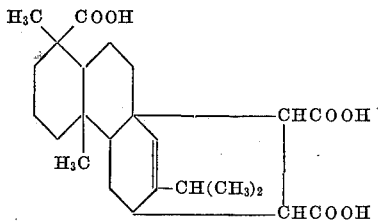

In preparing the above adduct substantially pure levopimaric acid can be employed, or the adduct can be derived by reacting at elevated temperatures, of the order of from about 140° C. to 200° C. and higher if desired, fumaric acid and a material that contains levopimaric acid, preferably in a substantial amount, or a material that contains resin acids capable of isomerizing to levopimaric acid under conditions of the reaction, preferably in substantial amounts. Examples of such materials include wood rosin, tall oil rosin, gum rosin, tall oil, and mixtures of two or more.

Methods of preparing the adduct are well known in the art and are described in Pats. 2,994,635 and 2,995,483, reference to which is hereby made.

The epoxy compounds that are condensed with the above adduct have the structural formula

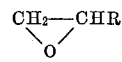

wherein R is selected from the group consisting of hydrogen; alkyl, such as methyl and ethyl; aryl, such as phenyl; and halogenated alkyl such as chloromethyl and bromomethyl.

Specific examples of epoxy compounds include epoxyethane, also known as ethylene oxide; 1,2-epoxypropane, also known as propylene oxide; 3-chloro-1,2-epoxypropane, also known as epichlorohydrin; and 1,2-epoxybutane.

Another suitable epoxy compound for use in carrying out this invention is styrene oxide which has the formula

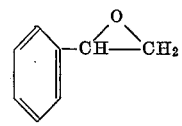

To obtain the reaction product of this invention, it is necessary to employ at least 3 moles of the epoxy compound per mole of adduct, a slight excess of 3 moles being preferred to insure substantially complete reaction. Up to about 6 moles of epoxy compound can react under the conditions employed in carrying out this invention.

A reaction mass, derived in accordance with this invention, will contain components having the following structural formula

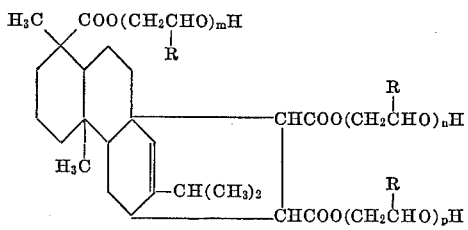

In the formula above, R is selected from the group consisting of hydrogen; alkyl, such as methyl and ethyl; aryl, such as phenyl; and halogenated alkyl, such as chloromethyl and bromomethyl. In the structural formula, $m$ is a whole number 1, 2 or 3; $n$ is a whole number, 1, 2 or 3; and $p$ is a whole number, 1, 2 or 3. The total of $m$, $n$, and $p$ is at least 3 and no greater than 6.

When 3 moles of epoxy compound are condensed with the levopimaric acid-fumaric acid adduct, $m$, $n$, and $p$ will all be 1. When 6 moles of epoxy compound are used, $m$, $n$, and $p$ can all be 2; or one can be 1, one can be 2, and one can be 3 with the average of the three ($m$, $n$, and $p$) being 2. If 4 moles of epoxy compound are condensed with the adduct, one of $m$, $n$, and $p$ will be 2 and the other two will be 1; the average value of the three ($m$, $n$, and $p$) being 1.33. When 5 moles of epoxy compound are condensed with the adduct, two of $m$, $n$, and $p$ can be 2 and the other 1; or one of $m$, $n$, and $p$ can be 3 and the other two 1; the average value of the three ($m$, $n$, and $p$) being 1.67.

The following examples are illustrative of this invention. All parts and percentages are by weight unless otherwise specified.

EXAMPLE 1

A three-necked reaction vessel is equipped with a motor-driven stirrer, a thermometer, a vertical condenser fitted with a T-tube for nitrogen entry, and a stopper on one neck. The stoppered neck is used as an addition port. About 820 parts of N wood rosin is added to the reaction vessel, and the vessel flushed with nitrogen. The rosin is then heated, under a blanket of nitrogen, to a temperature of about 180° C. During the next 1½ hours, 180 parts of fumaric acid is added, with stirring, in small portions. During the final hour of addition of the fumaric acid, the reaction mass in the vessel is maintained at a temperature that varies from about 205° C. to 210° C. After addition of all fumaric acid, the reaction mass is maintained at a temperature between 205° and 210° C. for about 1½ hours. The reaction mass, removed from the reaction vessel, has an acid number of 288, a drop softening point of 150° C. and a content of about 0.13% by weight of free unadducted fumaric acid.

EXAMPLE 2

About 350 parts of Example 1 reaction mass is placed in a high pressure autoclave and heated to about 180° C. About 310 parts of ethylene oxide is added to the autoclave under a pressure of about 200 p.s.i.g. The ethylene oxide is added slowly, in small increments, over a period of about 6 hours, during which time the temperature of the added ethylene oxide varied from about 180° C. to 190° C. The reaction mixture is maintained at about 190° C. under a pressure of about 200 p.s.i.g. for about 3 hours, cooled to room temperature and removed from the autoclave.

Unreacted ethylene oxide is removed from the reaction mixture. The resulting product is a viscous but pourable mass. It has an acid number of 1.6, a saponification number of 209, and a hydroxyl content (by acetylation) of about 6%. This product contains a substantial amount of a condensation product of ethylene oxide and levopimaric acid—fumaric acid adduct which has the structural formula

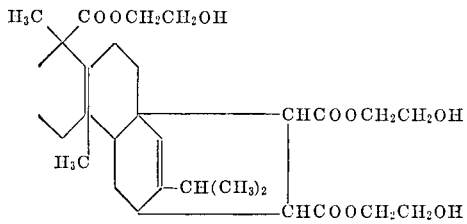

EXAMPLE 3

Example 2 is repeated using 1,2-epoxypropane. The product contains a condensation product of 1,2-epoxypropane and levoprimaric acid—fumaric acid adduct of the structural formula

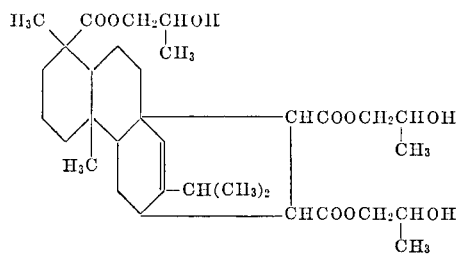

The reaction of the epoxy compound and the adduct is carried out in the absence of a catalyst at elevated temperature. The reaction is carried out at temperatures of from about 120° C. to 220° C. and preferably from about 160° C. to 200° C.

The reaction is carried out preferably at pressures above atmospheric (superatmospheric pressure). Pressure between about 15 p.s.i.g. and 225 p.s.i.g. can be satisfactorily used. Preferred pressure range is from 180 p.s.i.g. to 200 p.s.i.g., particularly when the epoxy compounds employed are ethylene oxide and propylene oxide.

Reaction can be carried out in the absence of an inert solvent diluent provided the reaction temperature is such that the adduct is in a fused state. Otherwise, a solvent, inert to the reactants and reaction product, for the adduct is desirable to provide a fluid mass. Suitable inert solvents are known and include toluene, dioxane, benzene and mixtures thereof. The solvent can be removed from the reaction mass by suitable convenient means such as by distillation.

Time of reaction of the epoxy compound with the adduct varies inversely with temperature and pressure and directly with epoxy compound concentration.

The reaction products of this invention are useful as ingredients of synthetic foams and as components of protective coating compositions for various substrates such as metals, paper, wood, and the like. They are useful as components of floor tile resins and in other plastics application, for example, as at least one of the alcohol constituents of various polyester resin systems.

It is to be understood that the above description and examples are illustrative of this invention and not in limitation thereof.

What I claim and desire to protect by Letters Patent is:

1. As a new composition of matter, a compound having the formula

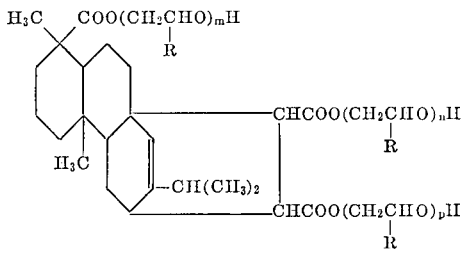

wherein R is selected from the group consisting of hydrogen, methyl, ethyl, phenyl and halogenated methyl; and wherein $m$, $n$, and $p$ are whole numbers 1, 2, or 3, the total of $m$, $n$, and $p$ being at least 3 and no greater than 6.

2. The compound of claim 1 wherein R is hydrogen.
3. The compound of claim 1 wherein R is methyl.
4. The compound of claim 2 wherein $m$, $n$, and $p$ are each 1.
5. The compound of claim 3 wherein $m$, $n$, and $p$ are each 1.

References Cited

UNITED STATES PATENTS

| | | | |
|---|---|---|---|
| 2,750,422 | 6/1956 | Sanderson | 260—617 |
| 2,517,563 | 8/1950 | Harris | 260—101 |
| 1,883,182 | 10/1932 | Webel | 260—475 |
| 3,125,592 | 3/1964 | Nevin | 260—405 |

OTHER REFERENCES

Groggins: Unit Process in Organic Chemistry, 4th ed., McGraw Hill, 1952.

LORRAINE A. WEINBERGER, Primary Examiner

P. J. KILLOS, Assistant Examiner

U.S. Cl. X.R.

117—130, 132, 138.8, 148, 155; 260—514.5